United States Patent
Simmons et al.

(10) Patent No.: US 12,187,516 B2
(45) Date of Patent: Jan. 7, 2025

(54) CARTON AND BLANK THEREFOR

(71) Applicant: WestRock Packaging Systems, LLC, Atlanta, GA (US)

(72) Inventors: Stephen G. Simmons, Chesterfield, VA (US); Casey P. Grey, Richmond, VA (US); Bradford Walling, Chesterfield, VA (US); Matthew E. Zacherle, Chesterfield, VA (US); Eric D. Linvill, Alvsjo (SE); Linh L. Kooc, Richmond, VA (US)

(73) Assignee: WestRock Packaging Systems, LLC, Atlanta, GA (US)

( * ) Notice: Subject to any disclaimer, the term of this patent is extended or adjusted under 35 U.S.C. 154(b) by 824 days.

(21) Appl. No.: 17/263,629

(22) PCT Filed: Jul. 17, 2019

(86) PCT No.: PCT/US2019/042128
§ 371 (c)(1),
(2) Date: Jan. 27, 2021

(87) PCT Pub. No.: WO2020/023257
PCT Pub. Date: Jan. 30, 2020

(65) Prior Publication Data
US 2021/0284413 A1     Sep. 16, 2021

Related U.S. Application Data

(60) Provisional application No. 62/711,277, filed on Jul. 27, 2018.

(51) Int. Cl.
B65D 71/42        (2006.01)
B32B 27/10        (2006.01)
(Continued)

(52) U.S. Cl.
CPC .............. *B65D 71/42* (2013.01); *B32B 27/10* (2013.01); *B32B 27/36* (2013.01); *B32B 29/002* (2013.01);
(Continued)

(58) Field of Classification Search
CPC ........ B65D 71/72; B65D 71/42; B32B 27/10; B32B 27/36; B32B 29/002;
(Continued)

(56) References Cited

U.S. PATENT DOCUMENTS 5,311,984 A * 5/1994 Harris .................... B65D 71/32
                                            206/427
5,323,895 A * 6/1994 Sutherland ............. B65D 71/40
                                            206/161
(Continued)

FOREIGN PATENT DOCUMENTS

CA      2984682 A1 *  8/2018  ............ B65D 71/42
EP      0346693 A2 * 12/1989
(Continued)

OTHER PUBLICATIONS

International Search Report issued in PCT/US2019/042128, dated Oct. 22, 2019.
JP Office Action dated Dec. 25, 2023, 3 pages.

*Primary Examiner* — Rafael A Ortiz
(74) *Attorney, Agent, or Firm* — Brian J. Goldberg; Rohini K. Garg

(57) ABSTRACT

Aspects of the disclosure relate to a carrier (90) for packaging one or more articles (B). The carrier comprises a main panel (12) having first (A1) and second (A2) adjacent apertures, arranged side by side, each for receiving a portion of an article. The main panel further comprises an annular series of tabs (16,18,20) formed around each of the first and second apertures. The tabs of each annular series are hingedly connected to the main panel such that at least some (Continued)

of the tabs yield out of the plane of the main panel when an article is received in the respective aperture so as to bear against the article. The main panel comprising a first layer (CL) comprising a paperboard substrate and a second layer (PL) providing a tear resistant layer wherein the tear resistant layer is disposed above the paperboard substrate.

20 Claims, 14 Drawing Sheets

(51) Int. Cl.
  *B32B 27/36* (2006.01)
  *B32B 29/00* (2006.01)
  *B32B 33/00* (2006.01)
  *B65D 71/72* (2006.01)
(52) U.S. Cl.
  CPC .............. *B32B 33/00* (2013.01); *B65D 71/72* (2013.01); *B32B 2255/12* (2013.01); *B32B 2307/5825* (2013.01); *B32B 2307/75* (2013.01); *B65D 2203/00* (2013.01); *B65D 2571/00265* (2013.01)
(58) Field of Classification Search
  CPC ...... B32B 2571/00265; B32B 2307/75; B32B 2307/5825; B32B 2255/12; B32B 33/00
  USPC ................................. 206/147–149, 140, 139
  See application file for complete search history.

(56) References Cited

U.S. PATENT DOCUMENTS

| | | | | |
|---|---|---|---|---|
| 5,415,278 | A | * | 5/1995 | Sutherland ............ B65D 71/46 |
| | | | | 206/148 |
| 5,445,262 | A | * | 8/1995 | Sutherland ............ B65D 71/46 |
| | | | | 206/148 |
| 5,706,936 | A | * | 1/1998 | Bernstein ............... B65D 71/44 |
| | | | | 206/148 |
| 5,878,876 | A | * | 3/1999 | Galbierz ................ B65D 71/48 |
| | | | | 206/148 |
| 2004/0097157 | A1 | | 5/2004 | Cosentino |
| 2004/0151929 | A1 | | 8/2004 | Cosentino et al. |
| 2005/0205436 | A1 | * | 9/2005 | Erickson ............... B65D 23/108 |
| | | | | 206/139 |

FOREIGN PATENT DOCUMENTS

| | | | | |
|---|---|---|---|---|
| JP | 10-218228 | | 8/1998 | |
| JP | 2013-514946 | A2 | 5/2013 | |
| WO | 2008/091774 | A1 | 7/2008 | |
| WO | WO2011075626 | A2 | 6/2011 | |
| WO | WO-2017192472 | A1 * | 11/2017 | ............ B65B 17/025 |
| WO | WO-2019222341 | A1 * | 11/2019 | ............ B65D 71/42 |

\* cited by examiner

CARTON AND BLANK THEREFOR

CROSS REFERENCE TO RELATED APPLICATIONS

This Application a U.S. National Phase Application filed under 35 U.S.C. § 371, based on International PCT Patent Application No. PCT/US2019/042128, filed Jul. 17, 2019, which application claims priority to U.S. Provisional Patent Application No. 62/711,277 filed on Jul. 27, 2018. The entire contents of these applications is incorporated herein by reference.

TECHNICAL FIELD

The present invention relates to cartons and to blanks for forming the same. More specifically, but not exclusively, the invention relates to a carrier of the top-gripping type having one or more apertures for receiving and retaining an article therein.

BACKGROUND

In the field of packaging it is known to provide cartons for carrying multiple articles. Cartons are well known in the art and are useful for enabling consumers to transport, store and access a group of articles for consumption. For cost and environmental considerations, such cartons or carriers need to be formed from as little material as possible and cause as little wastage in the materials from which they are formed as possible. Further considerations are the strength of the carton and its suitability for holding and transporting large weights of articles. It is desirable that the contents of the carton are secure within the carton.

It is well known to provide top gripping article carriers in which an aperture is formed in a panel of the carrier, wherein tabs are struck from material immediately about said aperture. The tabs are displaced out of the plane of said panel when an article is received in the aperture, and the tabs engage the article generally about a flange, chine, or lip of the article.

The present invention seeks to provide an improvement in the field of cartons, typically formed from paperboard or the like.

SUMMARY

A first aspect of the invention provides a top engaging carrier for packaging one or more articles comprising a main panel which comprises at least one aperture for receiving a portion of an article, the main panel further comprising an annular series of tabs formed around the aperture, the aperture defining a first edge of the tabs, the tabs of the annular series being hingedly connected to the main panel such that at least some of the tabs yield out of the plane of the main panel when an article is received in the aperture so as to bear against the article, the main panel comprising a first layer comprising a paperboard substrate and a second layer providing a tear resistant layer wherein the tear resistant layer is disposed above the paperboard substrate.

Optionally, an adhesive layer is provided between the first and second layers.

Optionally, the tear resistant layer comprises an upper surface and a lower surface, the lower surface opposes the upper surface and is disposed adjacent to the adhesive layer and wherein a printed ink layer is provided upon the upper surface of the tear resistant layer.

Optionally, the tear resistant layer comprises an n-axially oriented film.

Optionally, the tear resistant layer comprises a layer or film of Polyethylene Terephthalate (PET).

A second aspect of the invention provides a package comprising a top engaging carrier and at least one article, the top engaging carrier comprising a main panel which comprises at least one article receiving aperture, the main panel further comprising an annular series of tabs formed around the article receiving aperture, the article receiving aperture defining a first edge of the tabs, the tabs of the annular series being hingedly connected to the main panel such that at least some of the tabs yield out of the plane of the main panel so as to bear against a portion of the at least one article disposed in the article receiving aperture, the main panel comprising a first layer comprising a paperboard substrate and a second layer providing a tear resistant layer wherein the paperboard substrate of the tabs is disposed between the tear resistant layer and a side wall of the at least one article.

Optionally, the paperboard substrate layer of the tabs is disposed adjacent to the side wall of the at least one article.

Optionally, a first coating layer is disposed between the tear resistant layer and the paperboard substrate layer.

Optionally, a second coating layer is disposed between the paperboard substrate layer and the side wall of the at least one article.

A third aspect of the invention provides a method of forming a package comprising:

providing a blank comprising a main panel which comprises at least one article receiving aperture for receiving a portion of an article, the main panel further comprising an annular series of tabs formed around the article receiving aperture, the tabs of the annular series being hingedly connected to the main panel, the main panel comprising a first layer comprising a paperboard substrate and a second layer providing a tear resistant layer;

providing at least one article;

orienting the blank such that the paperboard substrate faces towards the at least one article;

engaging the at least one article with the blank, such that a portion of the at least one article passes through the paperboard substrate and subsequently through the tear resistant layer so as to secure the at least one article in the article receiving aperture by engaging the tabs with an undercut on the at least one article.

Optionally, orienting the blank such that the paperboard substrate faces towards the at least one article orients the tear resistant layer so as to face away from at least one article.

Optionally, engaging the at least one article with the blank folds the tabs of the annular series out of the plane of the main panel and wherein the tear resistant layer is disposed uppermost.

Within the scope of this application it is envisaged or intended that the various aspects, embodiments, examples, features and alternatives set out in the preceding paragraphs, in the claims and/or in the following description and drawings may be considered or taken independently or in any combination thereof.

Features or elements described in connection with, or relation to, one embodiment are applicable to all embodiments unless there is an incompatibility of features. One or more features or elements from one embodiment may be incorporated into, or combined with, any of the other embodiments disclosed herein, said features or elements extracted from said one embodiment may be included in addition to, or in replacement of one or more features or elements of said other embodiment.

A feature, or combination of features, of an embodiment disclosed herein may be extracted in isolation from other features of that embodiment. Alternatively, a feature, or combination of features, of an embodiment may be omitted from that embodiment.

BRIEF DESCRIPTION OF THE DRAWINGS

Exemplary embodiments of the invention will now be described with reference to the accompanying drawings, in which.

DETAILED DESCRIPTION OF EMBODIMENTS

Detailed descriptions of specific embodiments of the package, blanks and cartons are disclosed herein. It will be understood that the disclosed embodiments are merely examples of the way in which certain aspects of the invention can be implemented and do not represent an exhaustive list of all of the ways the invention may be embodied. As used herein, the word "exemplary" is used expansively to refer to embodiments that serve as illustrations, specimens, models, or patterns. Indeed, it will be understood that the packages, blanks and cartons described herein may be embodied in various and alternative forms. The Figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figures 1, 1A:
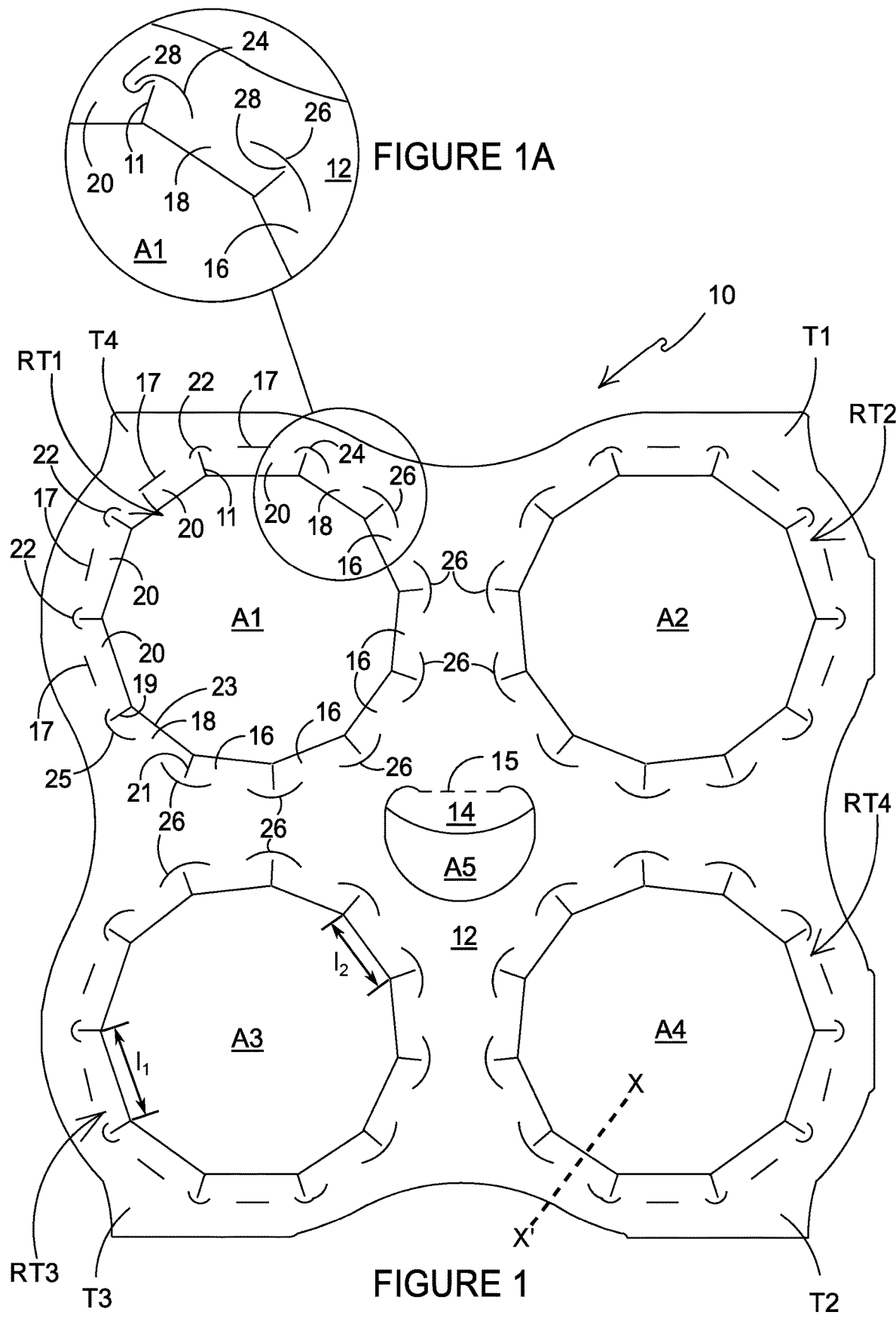
FIG. 1 is a plan view from above of a blank for forming a carton or top-gripping clip according to a first embodiment.
FIG. 1A is an enlarged view of a portion of the blank of FIG. 1.
Figure 2:
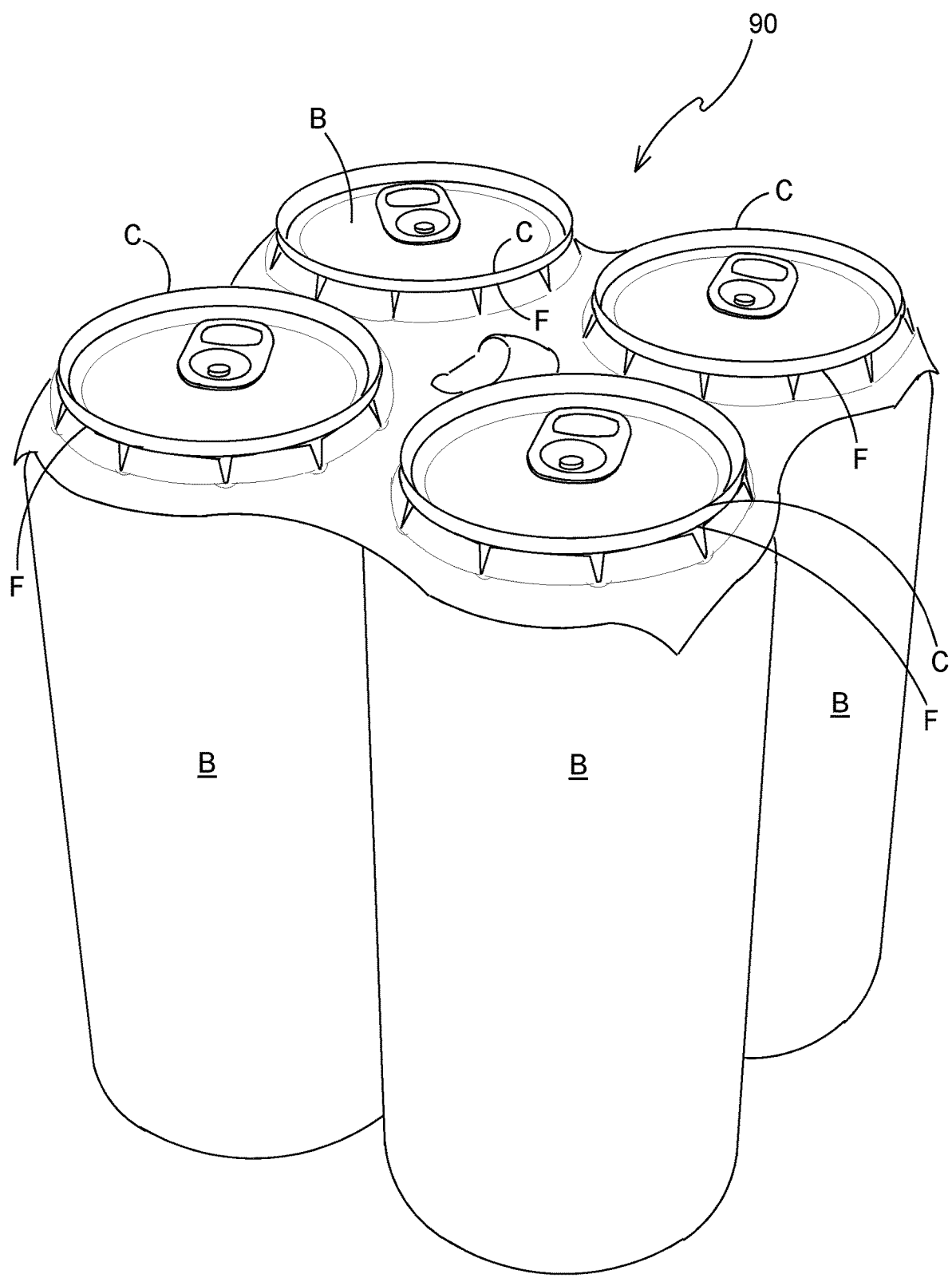
FIG. 2 is a perspective view from above of a carrier or carton formed from the blank of FIG. 1.
Figure 4:
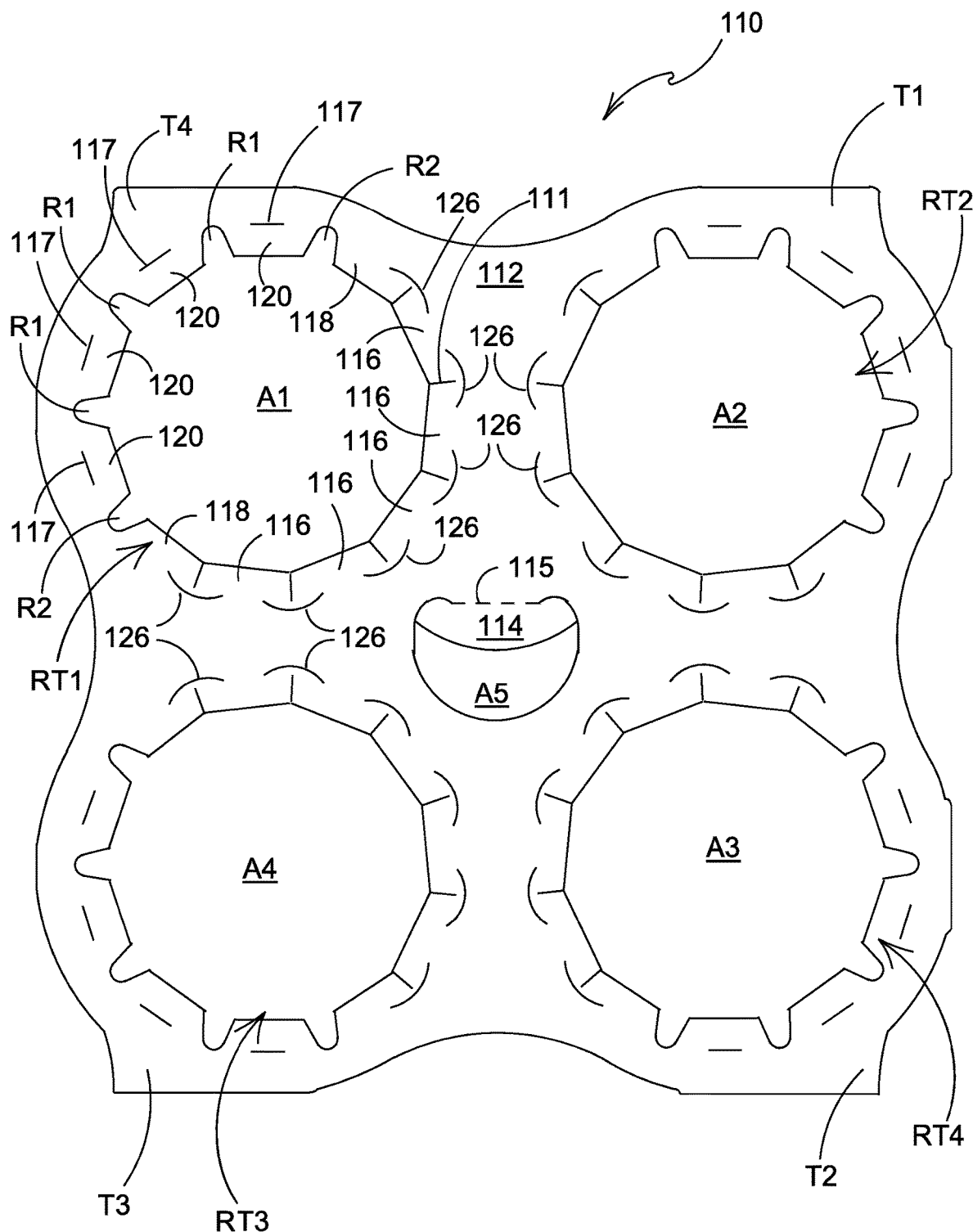
FIG. 4 is a plan view from above of a blank for forming a carton according to a second embodiment.
Figure 5:
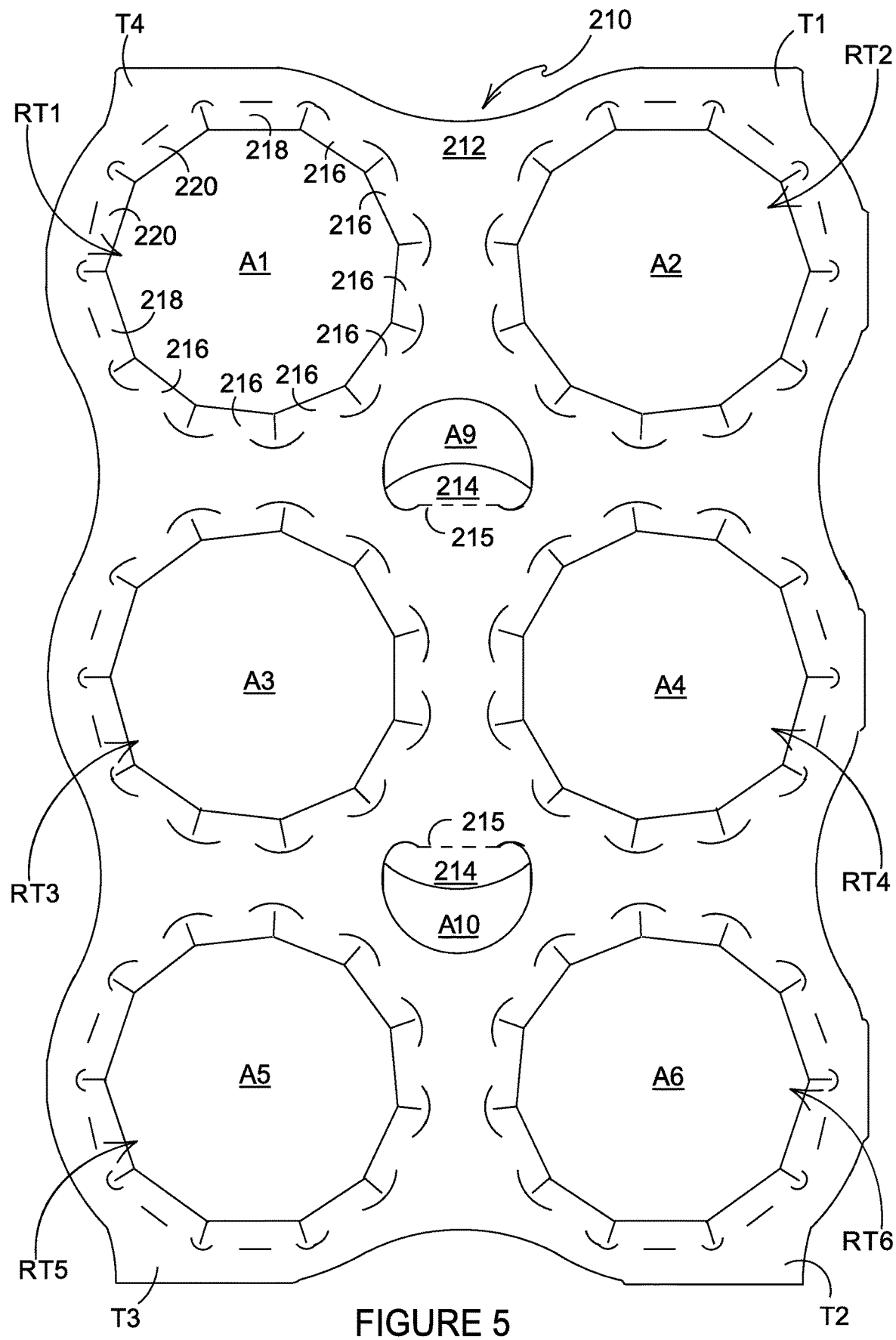
FIG. 5 is a plan view from above of a blank for forming a carton according to a third embodiment.
Figure 7:
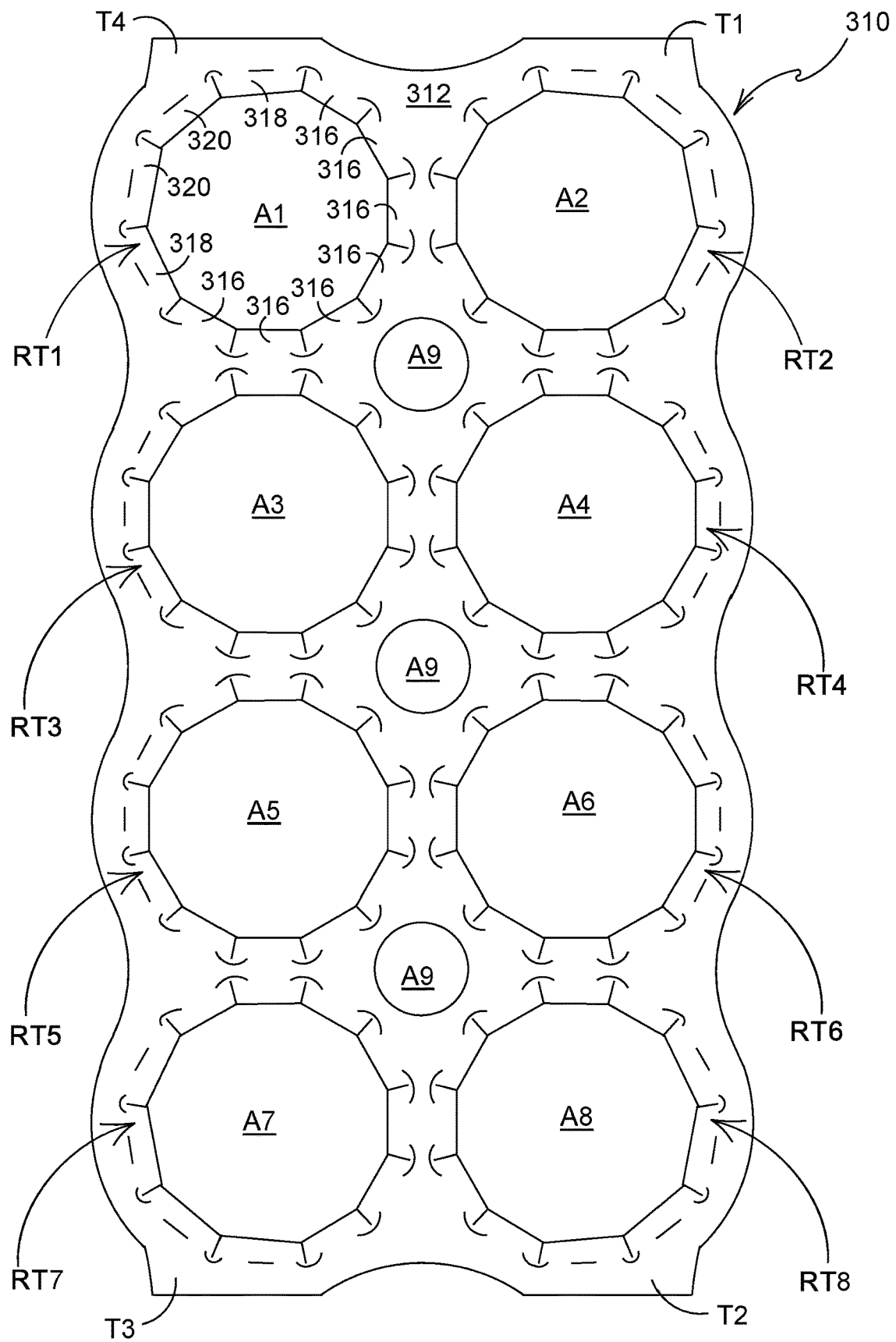
FIG. 7 is a plan view from above of a blank for forming a carton according to a fourth embodiment.
Figure 8:
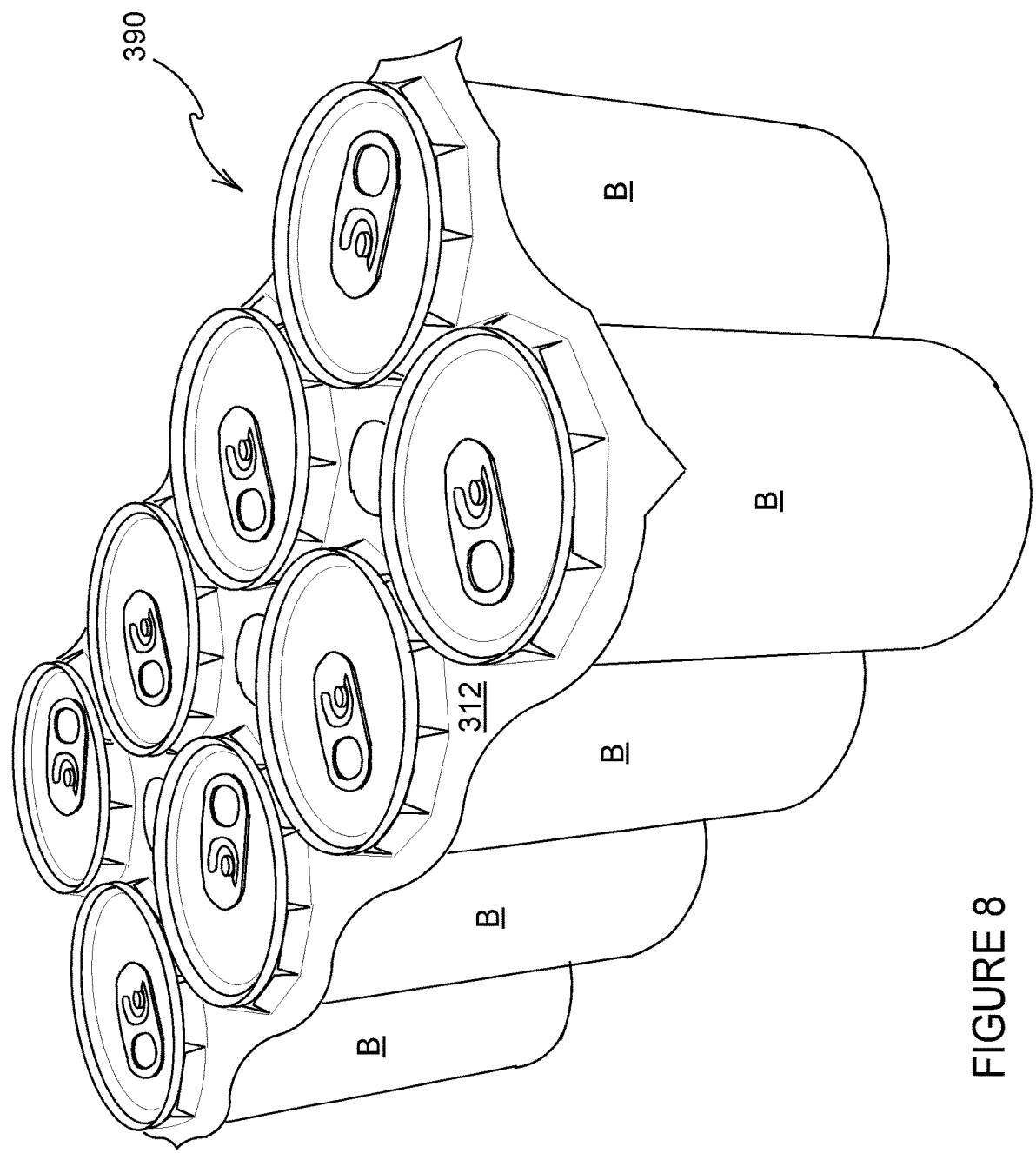
FIG. 8 is a perspective view from above of a carton formed from the blank of FIG. 7.
Figure 9:
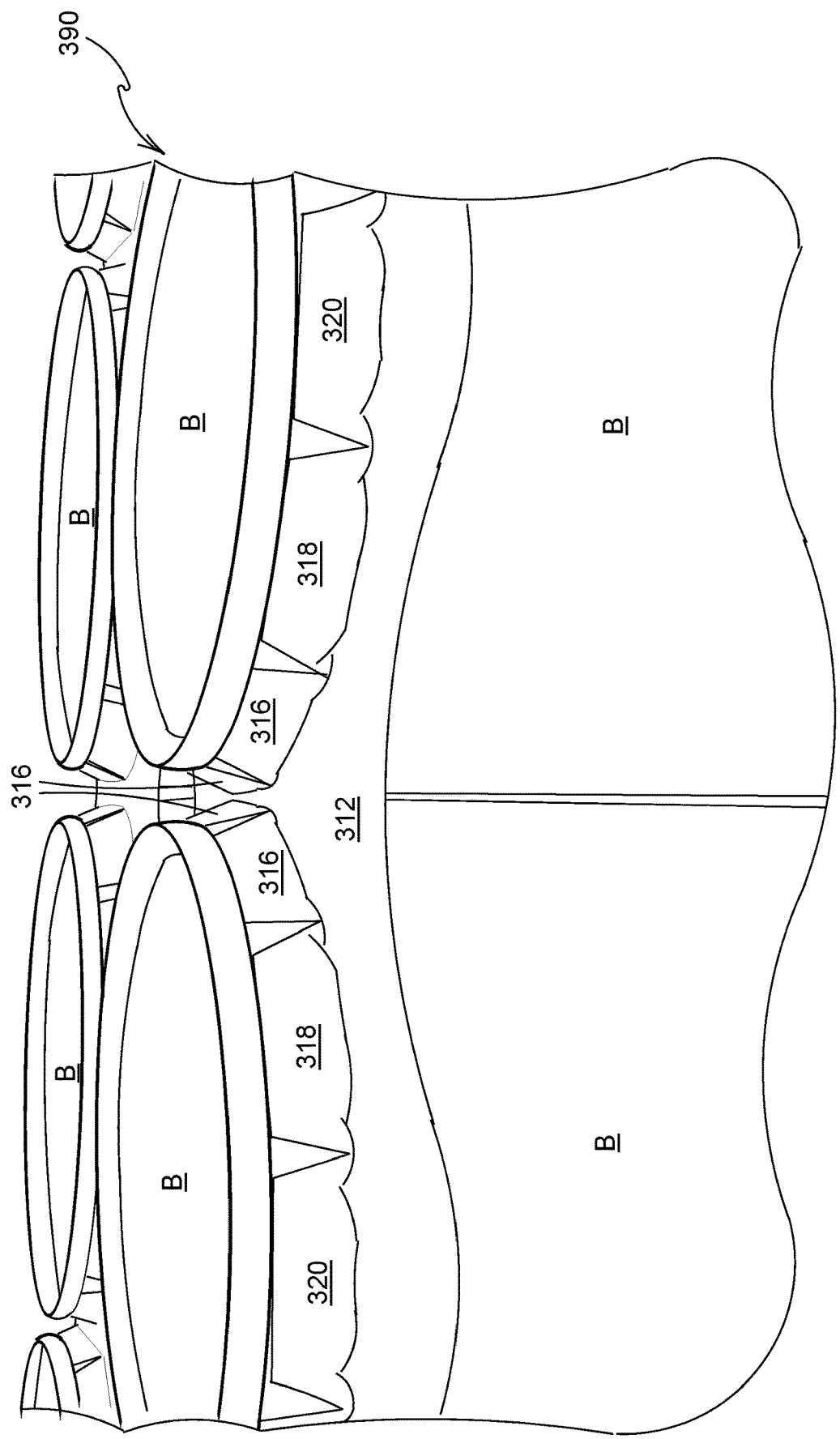
FIG. 9 is a close-up view of a portion of the carton of FIG. 8.
Figure 10:
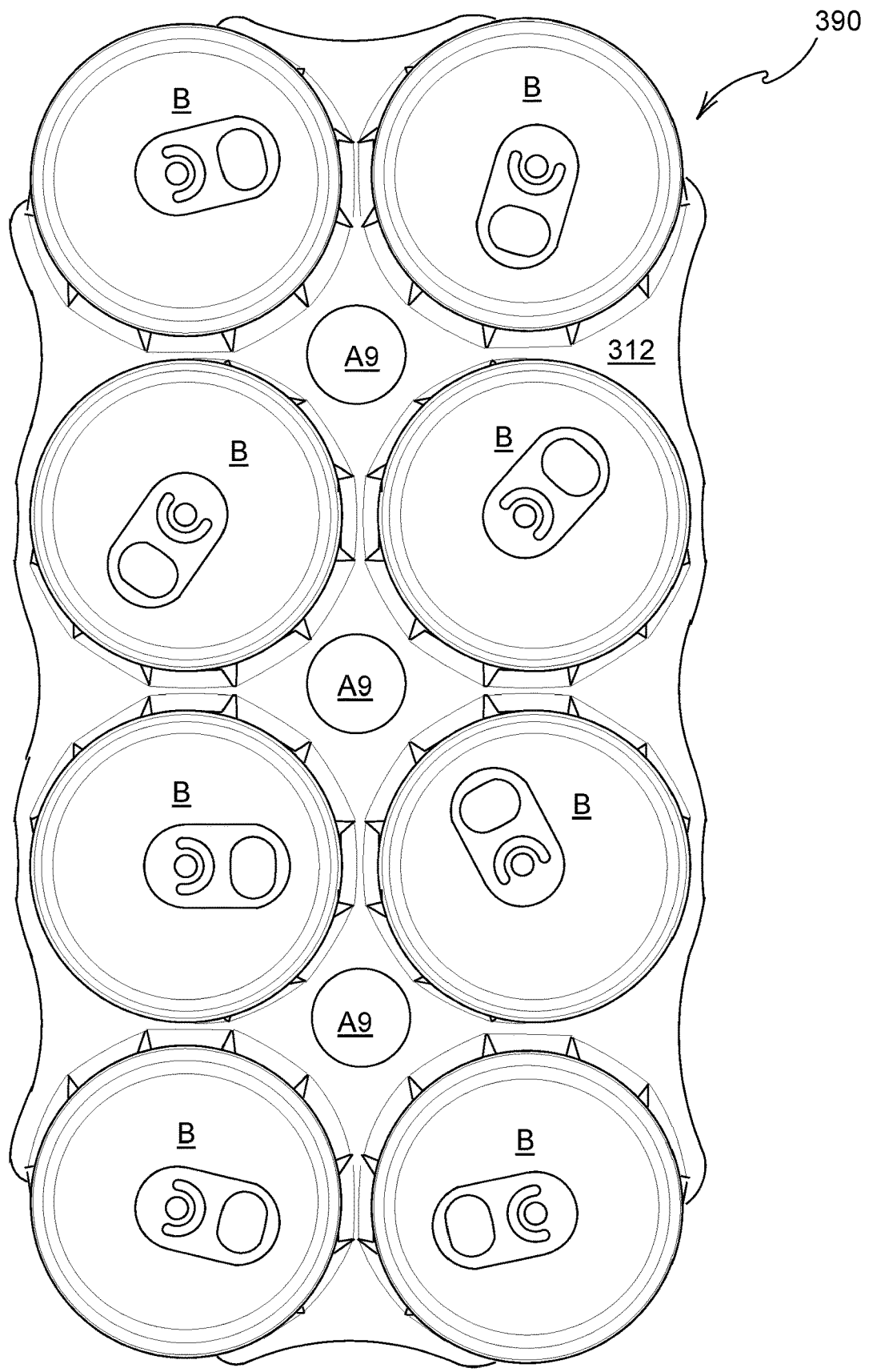
FIG. 10 is a plan view from above of the carton formed from the blank of FIG. 7.

Referring to FIG. 1, there is shown a plan view of a blank 10 capable of forming a carton, clip, or top-gripping carrier 90, as shown in FIG. 2, for containing and carrying a group of primary products such as, but not limited to, bottles or cans, hereinafter referred to as articles B, as shown in FIG. 2. The blank 10 forms a secondary package for packaging at least one primary product container or package. Alternative blanks 110, 210, 310 are shown in FIGS. 4, 5 and 7.

In the embodiments detailed herein, the terms "carton", "clip", "top-gripping carrier" and "carrier" refer, for the non-limiting purpose of illustrating the various features of the invention, to a device for engaging and carrying articles, such as primary product containers. It is contemplated that the teachings of the invention can be applied to various product containers, which may or may not be tapered and/or cylindrical. Exemplary containers include bottles (for example metallic, glass or plastics bottles), cans (for example aluminium cans), tins, pouches, packets and the like.

The blanks 10, 110, 210, 310, 410 are formed from a sheet of suitable substrate. It is to be understood that, as used herein, the term "suitable substrate" includes all manner of foldable sheet material such as paperboard, corrugated board, cardboard, plastic, combinations thereof, and the like. It should be recognised that one or other numbers of blanks may be employed, where suitable, for example, to provide the carrier structure described in more detail below.

The packaging structures or cartons described herein may be formed from a sheet material such as paperboard, which may be made of or coated with materials to increase its strength. An example of such a sheet material is tear-resistant NATRALOCK® paperboard made by WestRock Company. It should be noted that the tear resistant materials may be provided by more than one layer, to help improve the tear-resistance of the package as is described in more detail below. Typically, one surface of the sheet material may have different characteristics to the other surface. One surface of the sheet material may be particularly smooth and may have a coating such as a clay coating or other surface treatment, this may be readily printable. The other surface of the sheet material may, on the other hand, be provided with a coating, a layer, a treatment or be otherwise prepared to provide properties such as one or more of tear-resistance, good glue-ability, heat sealability, or other desired functional properties, this surface may be printed upon, in some embodiments the surface may require a treatment to improve adhesion of the ink or dye.

In the illustrated embodiments, the blanks 10, 110, 210, 310, 410 are configured to form a carton or carrier 90, 190, 290, 390, 490 for packaging an exemplary arrangement of exemplary articles B. In the embodiments illustrated in FIGS. 1 and 4, the arrangement is a 2×2 matrix or array. In those illustrated embodiments two rows of two articles are provided, and the articles B are beverage cans. In the embodiments illustrated in FIGS. 5 and 11, the arrangement is a 3×2 matrix or array. In those illustrated embodiments three rows of two articles are provided, and the articles B are beverage cans. In the embodiment illustrated in FIG. 7, the arrangement is a 4×2 matrix or array. In that illustrated embodiment four rows of two articles are provided, and the articles B are beverage cans. Alternatively, the blanks 10, 110, 210, 310, 410 can be configured to form a carrier 90, 190, 290, 390, 490 for packaging other types, number and size of articles and/or for packaging articles in a different arrangement or configuration.

Referring to FIG. 1, the blank 10 comprises a main panel 12 for forming a top wall or engaging panel of a carrier 90 (see FIG. 2).

The main panel 12 includes at least one article retention structure RT1, RT2, RT3, RT4. In the embodiment of FIG. 1 the main panel 12 comprises a plurality of article retention structures RT1, RT2, RT3, RT4, specifically four article retention structures RT1, RT2, RT3, RT4 arranged in 2×2 matrix or array.

Each of the article retention structures RT1, RT2, RT3, RT4 is substantially similar in construction and therefore they will be described in detail with reference only to the first article retention structure RT1.

The first article retention structure RT1 comprises an aperture A1. The first aperture A1 is an eleven-sided polygon, also called a hendecagon. In other embodiments, other polygonal shapes may be employed.

A plurality of article engaging tabs 16, 18, 20 are arranged about the periphery of the aperture A1. Each tab 16, 18, 20 is hinged to the main panel 12.

Each tab 16, 18, 20 is separated from its adjacent neighbours by a linear cutline 11. In this way each tab 16, 18, 20 comprises a first side edge 19 and a second side edge 21. Each tab 16, 18, 20 comprises a free end edge 23 opposing its hinged edge. The free end edges 23 form engaging edges for retaining an article B, or at least a portion thereof, within the aperture A1. The free end edges 23 each define a side of the polygonal shape of the first aperture A1. Each of the linear cutlines 11, which define the side edges of the tabs 16, 18, 20, extend from a vertex or corner of the polygonal shape of the first aperture A1. The linear cutlines 11 may be substantially radially arranged with respect to a notional circle that passes through each of the vertices of the polygonal shape of the first aperture A1. The linear cutlines 11 comprise a first proximal end that intersects with a vertex or corner of the polygonal shape of the first aperture A1. The linear cutlines 11 comprise a second distal end.

The plurality of article engaging tabs 16, 18, 20 comprises a first series or first set of first article engaging tabs 16, a second series or second set of second article engaging tabs 18, and a third series or third set of third article engaging tabs 20.

The first article engaging tabs 16 of the first set, are located on the main panel 12 in a region in which the article engaging tabs 16 are subject to the greatest stress or deformation when an article B is received in the first article retention structure RT1.

A first arcuate cutline 26 is disposed proximate each of the linear cut lines 11 defining the side edges of the first article engaging tabs 16. Each first arcuate cutline 26 is spaced apart from the second distal end of the associated linear cutline 11. In this way, a connecting portion 28 or "nick" is defined between a pair of adjacent first article engaging tabs 16. (See FIG. 1A).

The third article engaging tabs 20 of the third set are located on the main panel 12 in a region in which the article engaging tabs 20 are subject to the least stress or deformation when an article B is received in the first article retention structure RT1.

A third arcuate cutline 22 is disposed proximate each of the linear cut lines 11 defining the side edges of the third article engaging tabs 20. Each third arcuate cutline 22 is spaced apart from the second distal end of the associated linear cutline 11. In this way, a connecting portion 28 or "nick" is defined between a pair of adjacent third article engaging tabs 20. (See FIG. 1A). Those connecting portions 28 or "nicks" are provided for maintaining a connection between a pair of adjacent tabs 16, 18, 20 even after an article B has been inserted into the aperture A1, A2, A3, A4, and displaced the article engaging tabs 16, 18, 20. (See FIGS. 3A and 3B). The connecting portions 28 connect the respective tab 16, 18, 20 with the next adjacent tab 16, 18, 20, thereby at least mitigating against, preventing or inhibiting the respective tab 16, 18, 20 from wobbling, twisting or rotating about the axis denoted by a notional line X-X' (See article retention structure RT4 in FIG. 1).

The second article engaging tabs 18 of the second set, are located on the main panel 12 so as to provide a transition between one of the first article engaging tabs 16 and one of the third article engaging tabs 20.

A second arcuate cutline 24, 25 is disposed proximate a cut line 11 separating each of the second article engaging tabs 18 from an adjacent third article engaging tab 20.

Each second arcuate cutline 24, 25 is spaced apart from the second distal end of the linear cutlines 11 so as to define a connecting portion 28 or "nick" between a respective one of the second article engaging tabs 18 and the third article engaging tab 20 adjacent to it.

Each of the first and third arcuate cutlines 22, 26 is arranged symmetrically about the linear cutline with which it is associated. Each of the second arcuate cutlines 24, 25 is asymmetrically arranged about one of the linear cutlines 11.

The first, second and third arcuate cutlines 26, 24, 25, 22 provide optional stress relief in the main panel 12 when the first, second and third article engaging tabs 16, 18, 20 are displaced out of the plane of the main panel 12.

The first and third arcuate cutlines 26, 22 are arranged symmetrically about the respective linear cutline 11 with which they are associated. The first arcuate cutlines 26 are larger in dimension (in other words have a larger radius of curvature) than the third arcuate cutlines 22. The first arcuate cutlines 26 comprise a first radius of curvature, the third arcuate cutlines 22 comprise a second radius of curvature; the first radius of curvature is larger than the second radius of curvature.

Each of the second cutlines 24, 25 is arranged asymmetrically about the respective linear cutline 11 with which it is associated. The second cutlines 24, 25 comprise a first portion and a second portion contiguously arranged with each other. The first portion is disposed proximate the second article engaging tab 18 and the second portion is disposed proximate a third article engaging tab 20. The first portion of each of the second cutlines 24, 25 comprises a first radius of curvature, the second portion of each of the second cutlines 24, 25 comprises a second radius of curvature; the first radius of curvature is larger than the second radius of curvature.

The second cutlines 24, 25 may be considered to comprise one half of a first arcuate cutline 26 and one half of a third arcuate cutline 22 contiguously arranged with each other.

The second cutlines 24, 25 form asymmetrical 'C'-shaped cuts, whereas the first and third cutlines 26, 22 form symmetrical 'C'-shaped cuts. The second cutlines 24, 25 are employed at the boundary between a first area of the main panel 12 that is subject to higher stress upon displacement of the first article engaging tabs 16 and a second area of the main panel 12 that is subject to lower stress upon displacement of the third article engaging tabs 20. The higher stress area of the main panel 12 occurs where the first tabs 16 are located as these first tabs 16 undergo higher bending stress, when an article B is inserted into the respective aperture A1, A2, A3, A4, compared to the third tabs 20, which are disposed in the lower stress area of the main panel 12.

Each of the third article engaging tabs 20 is defined in part by a second linear cutline 17 provided in the main panel 12.

Each second linear cutline 17 is disposed between a pair of adjacent arcuate cutlines 24, 25, 22; and in a spaced apart relationship with each of the pair of adjacent arcuate cutlines 24, 25, 22. Each of the third article engaging tabs 20 adjacent to one of the second article engaging tabs 18 comprises a second linear cutline 17 disposed between a third arcuate cutline 22 and second arcuate cutlines 24, 25; and in a spaced apart relationship with respect to both the third arcuate cutline 22 and the second arcuate cutlines 24, 25. The remaining third article engaging tabs 20 comprise a second linear cutline 17 disposed between a pair of adjacent third arcuate cutlines 22 in a spaced apart relationship with each of the pair of adjacent third arcuate cutlines 22.

The second linear cutline 17 facilitates folding of each of the third article engaging tabs 20 with respect to the main panel 12.

The second linear cutline 17 defines at least in part a straight or linear fold line 17 by which each of the third article engaging tabs 20 is hinged to the main panel 12.

In the illustrated embodiment the first article retention structure RT1 comprises eleven tabs 16, 18, 20 arranged about the periphery of the aperture A1.

Optionally, the plurality of article engaging tabs 16, 18, 20 may vary in dimension according to their location on the main panel 12. The first article engaging tabs 16 may have a first width, the second article engaging tabs 18 may have a second width and the third article engaging tabs 20 may have a third width. The third width may be greater than the second width which in turn may be greater than the first width. In this way the free end edge 23, which forms an engaging edge E1, E2, of the first tabs 16 may be smaller in dimension than the free end edge 23 or engaging edge of the second or third tabs 18, 20.

In the illustrated embodiment, the article engaging tabs 16, located in the region of the main panel 12 and subject to the greatest stress or deformation when an article B is received in the article retention structure RT1, RT2, RT3, RT4, are smaller in dimension than the article engaging tabs 18, 20 located in the region of the main panel 12 subject to the least stress or deformation.

The main panel 12 may optionally comprise a handle structure. The handle structure may comprise a first handle aperture A5. The first handle aperture A5 is struck from the main panel 12 and is located in a region disposed centrally between a first pair of article retention structures RT1, RT2 and a second pair of article retention structures RT3, RT4. The first handle aperture A5 may be defined in part by a cushioning tab 14 hinged to the main panel 12 by fold line 15. The first handle aperture A5 may be substantially crescent or "C" shaped.

The main panel 12 may optionally comprise one or more pull tabs T1, T2, T3, T4. The pull tabs T1, T2, T3, T4 may be located substantially at the corners of the main panel 12. The pull tabs T1, T2, T3, T4 may be substantially triangular in shape. The pull tabs T1, T2, T3, T4 may be arranged to extend the main panel 12 beyond the footprint of the group of articles B being packaged; in this way, a user may more readily disengage the carrier 90 from the articles B.

Optionally, the side edges of the main panel 12 may be arranged in a curvilinear or undulating shape. In this way, a first blank 10 may be arranged in a nested arrangement with a second blank 10. The undulating shape provides that the first and second blanks 10 together define a width which is less than twice the maximum width of an individual blank 10. This may have economic and environmental benefit by reducing the amount of substrate required to produce a given number of blanks 10.

Figure 15A:
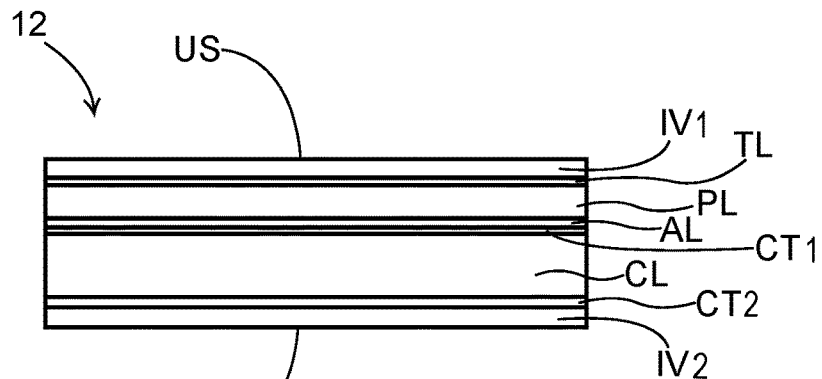
FIGS. 15 and 15B illustrate embodiments of a laminated structure for forming the blanks shown in FIGS. 1, 4, 5, 7 and 11.
Figure 15B:
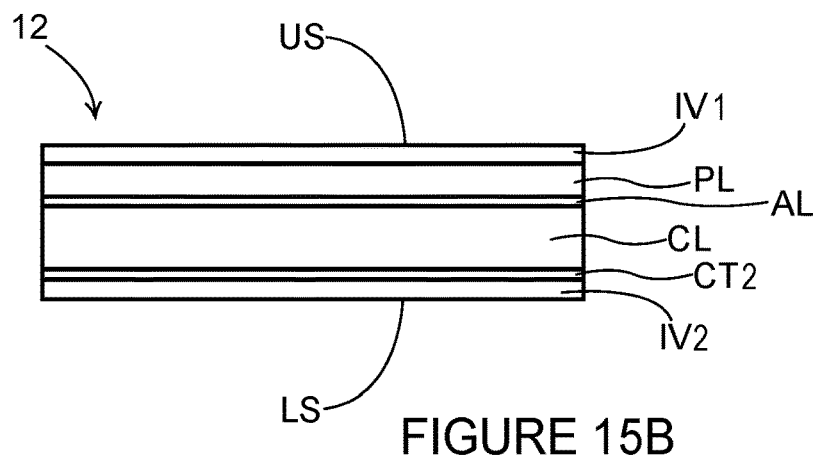

The main panel 12 includes at least a paperboard substrate CL and a tear resistant layer PL laminated together as illustrated in the embodiments of FIGS. 15A and 15B. It optionally includes an adhesive layer AL disposed between the paperboard substrate CL and the tear resistant layer PL. The material of the paperboard substrate CL may be selected from any conventional paperboard, for example, ranging in weight upwardly from about 10 pt., preferably from about 11 pt. to about 14 pt. An example of such a substrate is a 12-point SBS board or CNK board manufactured by WestRock Company. The paperboard substrate CL may be a bleached or unbleached board. The paperboard substrate may be or may not be coated. When coated, it may be coated on at least one side, optionally the side adjacent to the adhesive layer AL, with a conventional coating selected for compatibility with the printing method and board composition and/or optionally for providing a good contrast with the printed indicia provided by a printed ink layer IV1 which may be coated above or directly over the tear resistant layer PL. In the embodiment of FIG. 15A, the paperboard substrate CL is coated on both opposing surfaces with clay coatings CT1 and CT2. In the embodiment of FIG. 15B, the paperboard substrate CL is coated only on an inner or lower surface with a clay coating CT2.

The tear resistant layer PL may be disposed over an uncoated side of the paperboard substrate CL and may be formed of polymeric material and secured to the substrate as shown in FIG. 15B. The tear resistant layer PL may be disposed over an upper coated side of the paperboard substrate CL and may be formed of polymeric material and secured to the substrate as shown in FIG. 15A. The tear resistant layer PL imparts toughness to the laminate structure. Suitable tear resistant materials may include, but not be limited to, tear resistant laminated sheet material, e.g., NATRALOCK®, which may include a layer of an n-axially oriented film, e.g. MYLAR®, and may be a bi-axially oriented polyester, oriented nylon, cross-laminated polyolefin or high-density polyolefin. The orientation and cross-laminated structure of these materials contribute to their tear resistant characteristic. Also, tear resistance may be attributed to the chemical nature of the tear resistant material such as extruded metallocene-catalyzed polyethylene (mPE).

Alternatively, the tear resistant layer PL may be a layer of linear low-density polyethylene (LLDPE). In embodiments where linear low-density polyethylene (LLDPE) or mPE is used, it is not necessary to incorporate an adhesive layer. Other suitable materials having a high level of tear resistance may also be used.

The adhesive layer AL may be formed of polyolefin material such as a low-density polyethylene (LDPE). The adhesive layer AL may be placed between the paperboard substrate CL and the tear resistant layer PL to secure the tear resistant layer to the paperboard substrate CL substrate.

Optionally, the main panel 12 may include a printable second adhesive layer TL disposed over the tear resistant layer PL, the printable layer TL may be formed of polyolefin material such as a low-density polyethylene (LDPE).

In embodiments, without a printable layer TL as illustrated in FIG. 15B, the tear resistant layer PL may be treated to improve the wettability or adhesion of a finish IV, such as printing ink, dye or varnish or combination thereof.

The tear resistant layer PL may be subject to a treatment to increase the surface energy of the tear resistant layer PL in preparation for printing thereupon. This may be a wet chemical treatment, corona treatment or plasma treatment. This treatment increases the wettability of the tear resistant layer PL by increasing the surface energy to be greater than the surface energy (surface tension) of the printing ink, dye or varnish. This facilitates adhesion of ink and/or varnish to the tear resistant layer PL.

The upper or outer surface US of the main panel 12 comprises a surface which faces upwards when the carrier 90 is applied to a group of articles. In the embodiment of FIG. 15A, the upper surface US is provided by an optional, upper printed ink layer IV1 applied above the optional printable layer TL. The tear resistant layer PL is located closer to the upper surface US than the paperboard substrate CL and is disposed immediately below the printable layer TL, above or outside the paperboard substrate CL. The upper or outer surface US of the main panel 12 in the embodiment of FIG. 15B is provided by an optional, upper printed ink layer IV1 applied directly above or over the tear resistant layer PL. The tear resistant layer PL is again located closer to the upper surface US than the paperboard substrate CL and is disposed above or outside the paperboard substrate CL. In another alternative embodiment, the upper or outside surface US may be provided by the tear resistant layer PL which constitutes the uppermost layer when the carrier of such an embodiment is applied to a group of articles.

In the embodiment of FIG. 15A the upper surface of the paperboard substrate CL comprises a coating layer CT1 below the adhesive layer AL. The upper surface of the paperboard substrate CL of the embodiment of FIG. 15B may comprise an optional coating layer (not shown) below the adhesive layer AL. Providing a coating layer between the tear resistant layer PL and the paperboard substrate CL may allow control over the background colour to the upper printed ink layer IV1. For example, the background colour may be non-brown, optionally the background colour may substantially white. The coating layer such as at "CT1" may conceal a natural, untreated or unbleached, colour of the paperboard substrate CL; in this way, a more accurate colour rendition of the printed ink layer IV1 may be achieved, beneficially when the adhesive layer A1 and or tear resistant layer PL are transparent.

The lower or inner surface LS of the main panel 12 comprises a surface which faces downwards when the carrier 90 is applied to a group of articles. Optionally, the lower or inner surface LS of the main panel 12 in the embodiments of FIGS. 15A and 15B is provided by an optional, lower printed ink layer IV2 applied to an optional coating layer CT2 of the paperboard substrate CL. In an alternative embodiment, the lower surface LS of the main panel 12 may be provided by the paperboard substrate CL itself with its coated or uncoated surface facing downwards.

Turning to the construction of the carrier 90 from the blank 10, the blank 10 may be applied to a group of articles B. The blank 10 is lowered with respect to the group of articles B. Each of the article retention structures RT1, RT2, RT3, RT4 of the blank 10 is aligned with a respective article B in the group. Portions of the articles B pass through the main panel 12. The tabs 16, 18, 20 of each of the article retention structures RT1, RT2, RT3, RT4 are folded out of the plane of the main panel 12 and engage beneath the chime C (which may provide a flange F) of an article B. In this way, the tabs 16, 18, 20 grip or hold the article B and prevent or inhibit the article B from unintentionally separating from the main panel 12. The assembled carrier 90 is shown in FIG. 2.

Figure 3A:
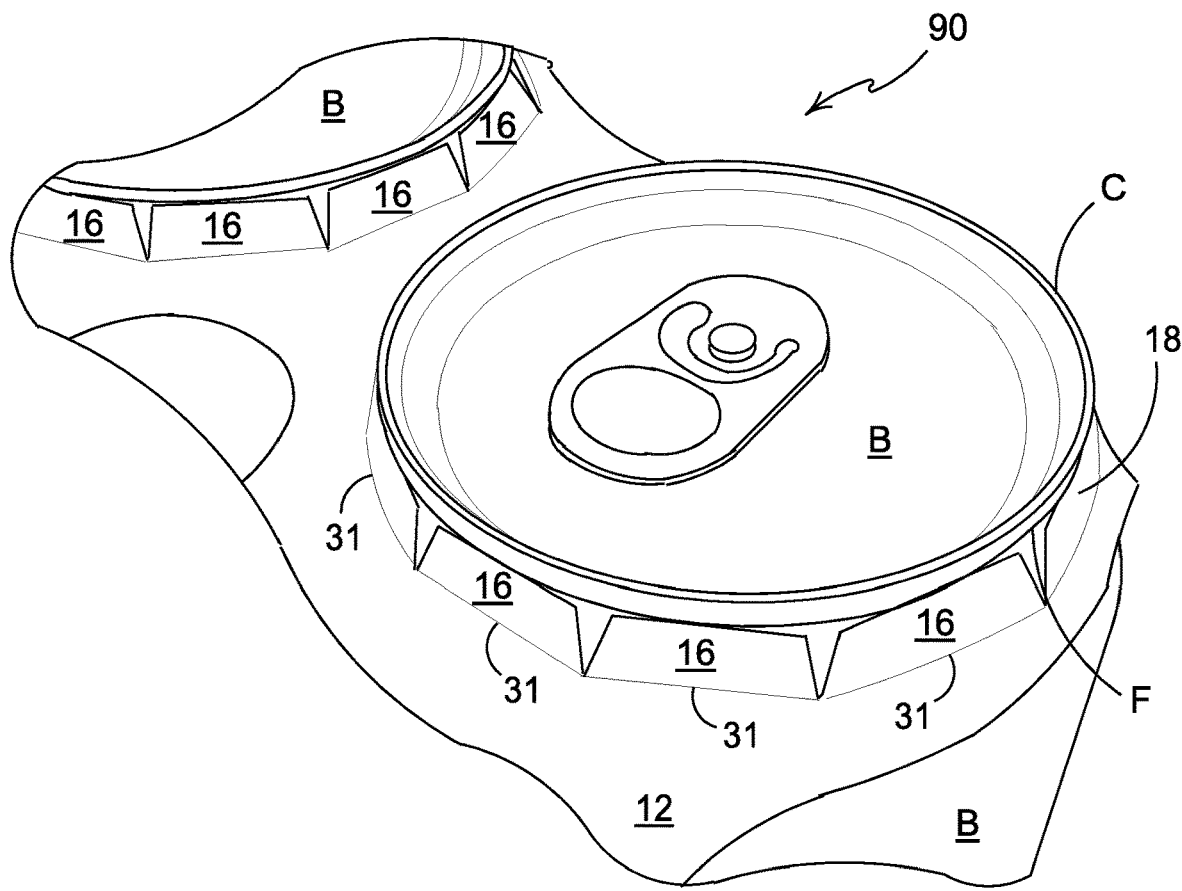
FIGS. 3A and 3B are enlarged views of a portion of the carrier of FIG. 2.
Figure 3B:
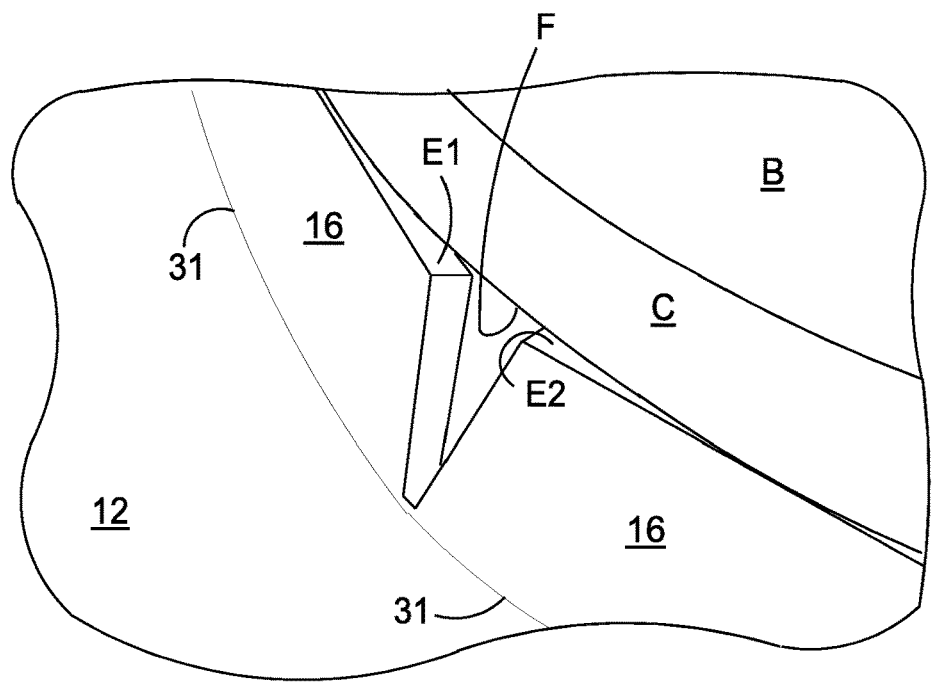

Referring in particular to FIG. 3A and to FIGS. 2 and 3B, the blank 10 forms a top engaging carrier 90 comprising a main panel 12 which comprises first and second adjacent apertures A1, A3 arranged side by side each for receiving a portion of an article B. The main panel 12 further comprises an annular series of tabs 16, 18, 20 formed around each of the first and second apertures A1, A3. The tabs 16, 18, 20 of each annular series are connected to the main panel 12 such that at least some of the tabs 16, 18, 20 yield out of the plane of the main panel 12, about fold lines 31, when an article B is received in the respective aperture A1, A3 so as to bear against the article B. The main panel 12 is applied to the group of articles B with the tear resistant layer disposed upper most, described in more detail below with regard to the embodiment of FIGS. 11 to 14.

Another optional feature of the carrier 90 is that the main panel 12 is defined by a perimeter to which no other part of the carrier 90 is connected. That is to say, the carrier 90 is free of connection to other panels for example, but not limited to, side or end wall panels which extend about the sides of the article group. The perimeter of the main panel 12 is therefore defined in its entirety by free, cut or unhinged edges.

Another optional feature of the carrier 90 is that the main panel 12 is defined by a perimeter including convexly curved edges and concavely curved edges; the radius of curvature of the convexly curved edges may be substantially equal to the radius of curvature of the concavely curved edges, thus allowing two similar blanks 10 to be placed in a nested or tessellated arrangement.

Referring now to FIG. 4, there is shown an additional embodiment of the present disclosure. In the second illustrated embodiment like numerals have, where possible, been used to denote like parts, albeit with the addition of the prefix "100" to indicate that these features belong to the second embodiment. The additional embodiment shares many common features with the first embodiment and therefore only the differences from the embodiment illustrated in FIGS. 1 to 3B will be described in detail.

Each of the first article engaging tabs 116 is constructed substantially similarly to those of the embodiment of FIGS. 1 to 3B.

Each of the third article engaging tabs 120 is spaced apart from its adjacent neighbours 120, 118 by a cutaway or recess R1, R2. In this way, each of the third article engaging tabs 120 comprises a first side edge and a second side edge. Each of the third article engaging tabs 120 comprises a free end edge opposing a hinged end edge defined in part by second linear cutline 117. The free end edges form engaging edges for retaining an article B, or at least a portion thereof, within the aperture A1, A2, A3, A4.

Each of the recesses R1, R2 comprises a curvilinear portion. In the illustrated embodiment the recesses R1, R2 comprise a rounded end. That is to say the curvilinear portion can be defined by a portion of the circumference of a circle. A portion of the recesses R1, R2 may be defined by a segment of a circle. A further portion of the recesses R1, R2 may be defined by a trapezoid; the trapezoid may be an isosceles trapezoid. The trapezoid has convergent side edges. Each of the third article engaging tabs 120 may be hinged to the main panel 112 by a straight fold line defined in part by, or interrupted by, the second linear cutlines 117; which straight fold line is in tangential contact, or intersects, with the rounded end of the adjacent recess R1, R2.

The curvilinear portion or rounded end of the cutaways or recesses R1, R2 may reduce the likelihood of tears propagating in the main panel 112 from the cutaways R1, R2.

The curvilinear end of each cutaway R1, R2 may be defined in part by a circle having a radius of curvature. In one embodiment, the radius of curvature of the rounded end of each cutaway R1, R2 may be equal to or more than 1/16" (1.6 mm).

Each of the second article engaging tabs 118 is spaced apart from its adjacent neighbouring third article engaging tab 120 by a cutaway or recess R1, R2. Each of the second article engaging tabs 118 is spaced apart from its adjacent neighbouring first article engaging tab 116 by a linear cutline 111; a first arcuate cutline 126 is provided proximate the linear cutline 111. The first arcuate cutline 126 is spaced apart from the linear cutline 111 so as to define, at least in part, a connecting portion or 'nick' between each second article engaging tabs 118 and said adjacent neighbouring first article engaging tab 116.

Referring now to FIGS. 5 to 14, there are shown additional embodiments of the present disclosure. In the third, fourth and fifth illustrated embodiments like numerals have, where possible, been used to denote like parts, albeit with the addition of the prefix "200", "300", "400" to indicate that these features belong to the third, fourth and fifth embodiment respectively. The additional embodiments share many common features with the first embodiment and therefore only the differences from the embodiment illustrated in FIGS. 1 to 3B will be described in detail.

Figure 6:
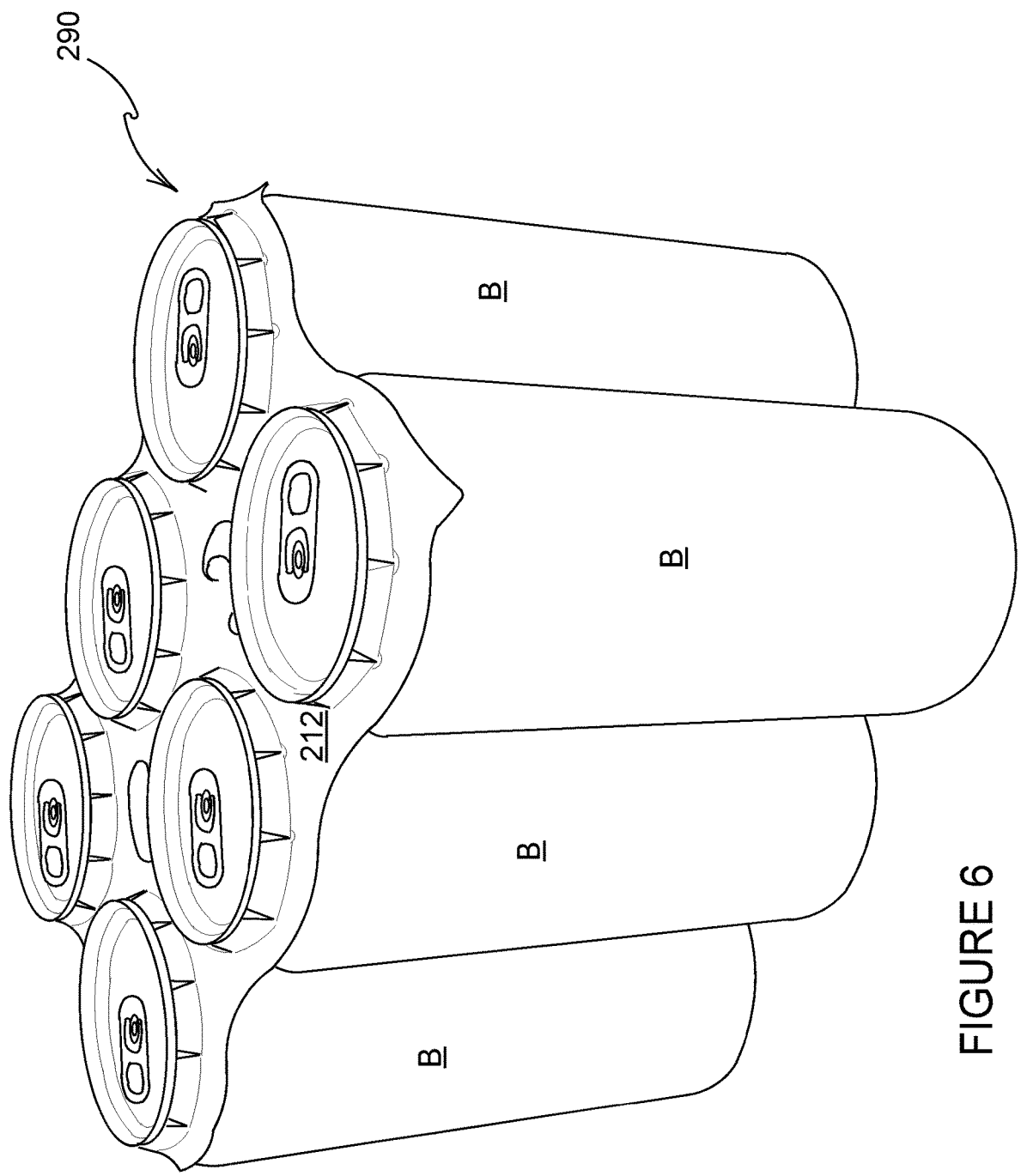
FIG. 6 is a perspective view from above of a carton formed from the blank of FIG. 5.

Referring to FIGS. 5 and 6, there is shown a blank 210 comprising a main panel 212 for forming a top wall or engaging panel of a carrier 290.

The main panel 212 comprises a plurality of article retention structures RT1, RT2, RT3, RT4, RT5, RT6; specifically, six article retention structures RT1, RT2, RT3, RT4, RT5, RT6 arranged in 2×3 matrix or array.

Each of the article retention structures RT1, RT2, RT3, RT4, RT5, RT6 comprises an aperture A1, A2, A3, A4, A5, A6.

Each of the article retention structures RT1, RT2, RT3, RT4, RT5, RT6 is substantially similar in construction to the first article retention structure RT1 of the embodiment of FIG. 1.

The main panel 212 comprises a handle structure. The handle structure comprises a first handle aperture A9 and a second handle aperture A10. The first handle aperture A9 is struck from the main panel 212 and is located in a region disposed centrally between a first pair of article retention structures RT1, RT2 and a second pair of article retention structures RT3, RT4. The first handle aperture A9 may be defined in part by a cushioning tab 214 hinged to the main panel 212 by fold line 215. The first handle aperture A9 may be substantially crescent or "C" shaped. The second handle aperture A10 is struck from the main panel 212 and is located in a region disposed centrally between the second pair of article retention structures RT3, RT4 and a third pair of article retention structures RT5, RT6. The second handle aperture A10 may be defined in part by a cushioning tab 214 hinged to the main panel 212 by fold line 215. The second handle aperture A10 may be substantially crescent or "C" shaped.

Referring to FIGS. 7 to 10, there is shown a blank 310 comprising a main panel 312 for forming a top wall or engaging panel of a carrier 390.

The main panel 312 comprises a plurality of article retention structures RT1, RT2, RT3, RT4, RT5, RT6, RT7, RT8; specifically, eight article retention structures RT1, RT2, RT3, RT4, RT5, RT6, RT7, RT8 arranged in 2×4 matrix or array.

Each of the article retention structures RT1, RT2, RT3, RT4, RT5, RT6, RT7, RT8 comprises an aperture A1, A2, A3, A4, A5, A6, A7, A8.

Each of the article retention structures RT1, RT2, RT3, RT4, RT5, RT6, RT7, RT8 is substantially similar in construction to the first article retention structure RT1 of the embodiment of FIG. 1.

The main panel 312 comprises a handle structure. The handle structure comprises three handle apertures A9. A first handle aperture A9 is struck from the main panel 312 and is located in a region disposed centrally between a first pair of article retention structures RT1, RT2 and a second pair of article retention structures RT3, RT4. A second handle aperture A9 is struck from the main panel 312 and is located in a region disposed centrally between the second pair of article retention structures RT3, RT4 and a third pair of article retention structures RT5, RT6. A third handle aperture A9 is struck from the main panel 312 and is located in a region disposed centrally between the third pair of article retention structures RT5, RT6 and a fourth pair of article retention structures RT7, RT8. The handle apertures A9 may be substantially circular in shape.

Referring now to the embodiment of FIG. 5, the article retention structures RT3, RT4 comprise more first article engaging tabs 216 than the article retention structures RT1, RT2, RT5, RT6 which are disposed in the corners of the main panel 212. In the illustrated embodiment the article retention structures RT3, RT4 comprise two second article engaging tabs 218 disposed adjacent to one another; in the article retention structures RT3, RT4 the third article engaging tabs 220 are omitted. This reflects the fact that more of the tabs of the article retention structures RT3, RT4 are disposed in high stress regions of the main panel 212 than the corner most retention structures RT1, RT2, RT5, RT6.

Referring now to the embodiment of FIGS. 7, 8, 9 and 10, the article retention structures RT3, RT4, RT5, RT6 comprise more first article engaging tabs 316 than the article retention structures RT1, RT2, RT7, RT8 which are disposed in the corners of the main panel 312. In the illustrated embodiment the article retention structures RT3, RT4, RT5, RT6 comprise two second article engaging tabs 318 disposed on opposing side of a single third article engaging tabs 320.

In this way it will be recognised that the proportion of the article engaging tabs of each type, first, second or third may be adjusted as desired in accordance with the stresses placed upon the carrier when loaded with articles.

Figure 11:
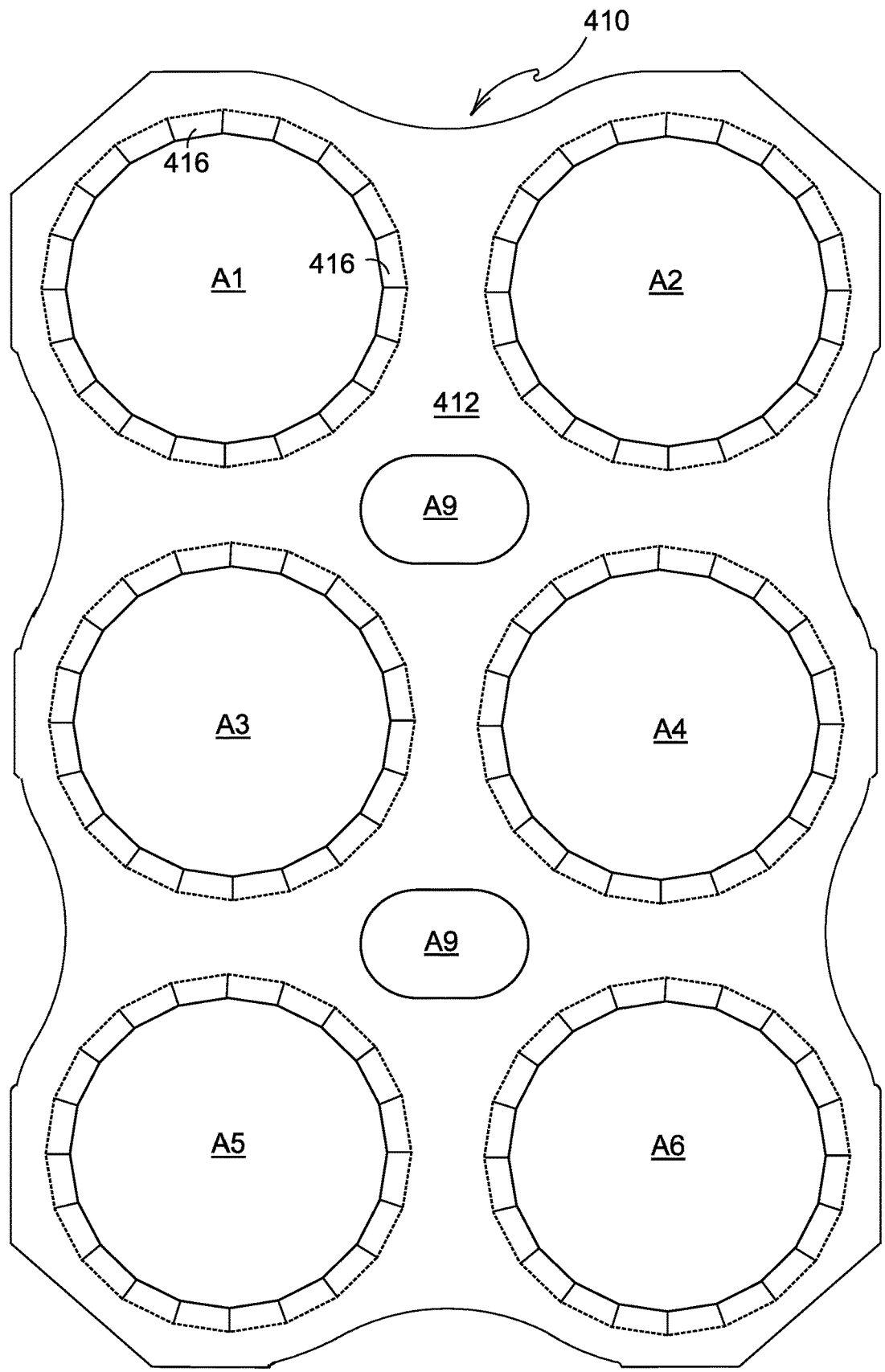
FIG. 11 is a plan view from above of a blank for forming a carton according to a fifth embodiment.
Figure 12:
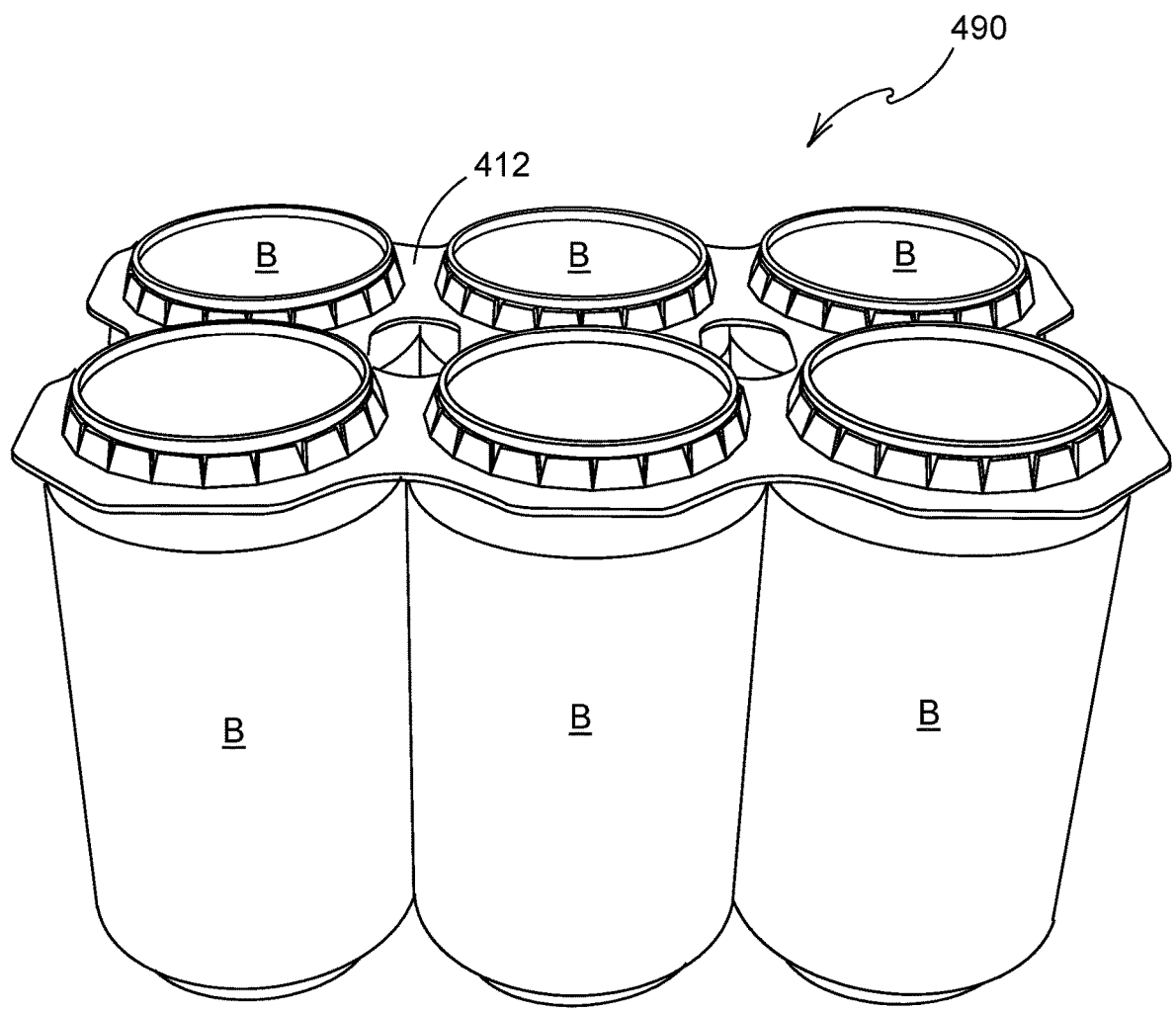
FIG. 12 is a perspective view from above of a carton formed from the blank of FIG. 11.

Referring to FIGS. 11 and 12, there is shown a blank 410 comprising a main panel 412 for forming a top wall or engaging panel of a carrier 490.

The main panel 412 comprises a plurality of article retention structures; specifically, six article retention structures arranged in 2×3 matrix or array.

Each of the article retention structures comprises an aperture A1, A2, A3, A4, A5, A6 and a plurality of article engaging tabs 416 disposed about the periphery of the aperture A1. In the illustrated embodiment the article retention structures comprise twenty article engaging tabs 416. In other embodiments, more or less article engaging tabs 416 may be provided. Each article engaging tab 416 is separated from its adjacent neighbours by a cut line or severance line. Each article engaging tab 416 is hingedly connected to the main panel 412 by a hinged connection in the form of a fold line which defines an outer edge (or proximal edge) of the respective article engaging tab 416. Each article engaging tab 416 extends from its outer edge to a free, inner edge (or distal edge) which opposes the hinged connection. The free inner edge of each article engaging tab 416 defines a portion of the respective one of the apertures A1, A2, A3, A4, A5, A6. Together the free inner edges of the plurality of article engaging tabs 416 define the respective one of the apertures A1, A2, A3, A4, A5, A6. When folded out of the plane of the main panel 412, the plurality of article engaging tabs 416 and each aperture A1, A2, A3, A4, A5, A6 define an opening in the main panel 412. The opening receives an upper portion of an article B as shown in FIG. 12.

The article engaging tabs 416 engage an article B. The free inner edges of the article engaging tabs 416 engage a flange F or other projection of the article B so as to retain the article in the carrier 490, see FIGS. 12, 13 and 14. The flange F defines an undercut which receives free inner edges of the article engaging tabs 416.

The main panel 412 comprises a handle structure. The handle structure comprises two handle apertures A9. A first handle aperture A9 is struck from the main panel 412 and is located in a region disposed centrally between a first pair of apertures A1, A2 and a second pair of apertures A3, A4. A second handle aperture A9 is struck from the main panel 412 and is located in a region disposed centrally between the second pair of apertures A3, A4 and a third pair of apertures A5, A6. The handle apertures A9 may be substantially elliptical in shape, in the illustrated embodiment the handle apertures A9 are "stadium" shaped (discorectangle or obround).

Figure 13:
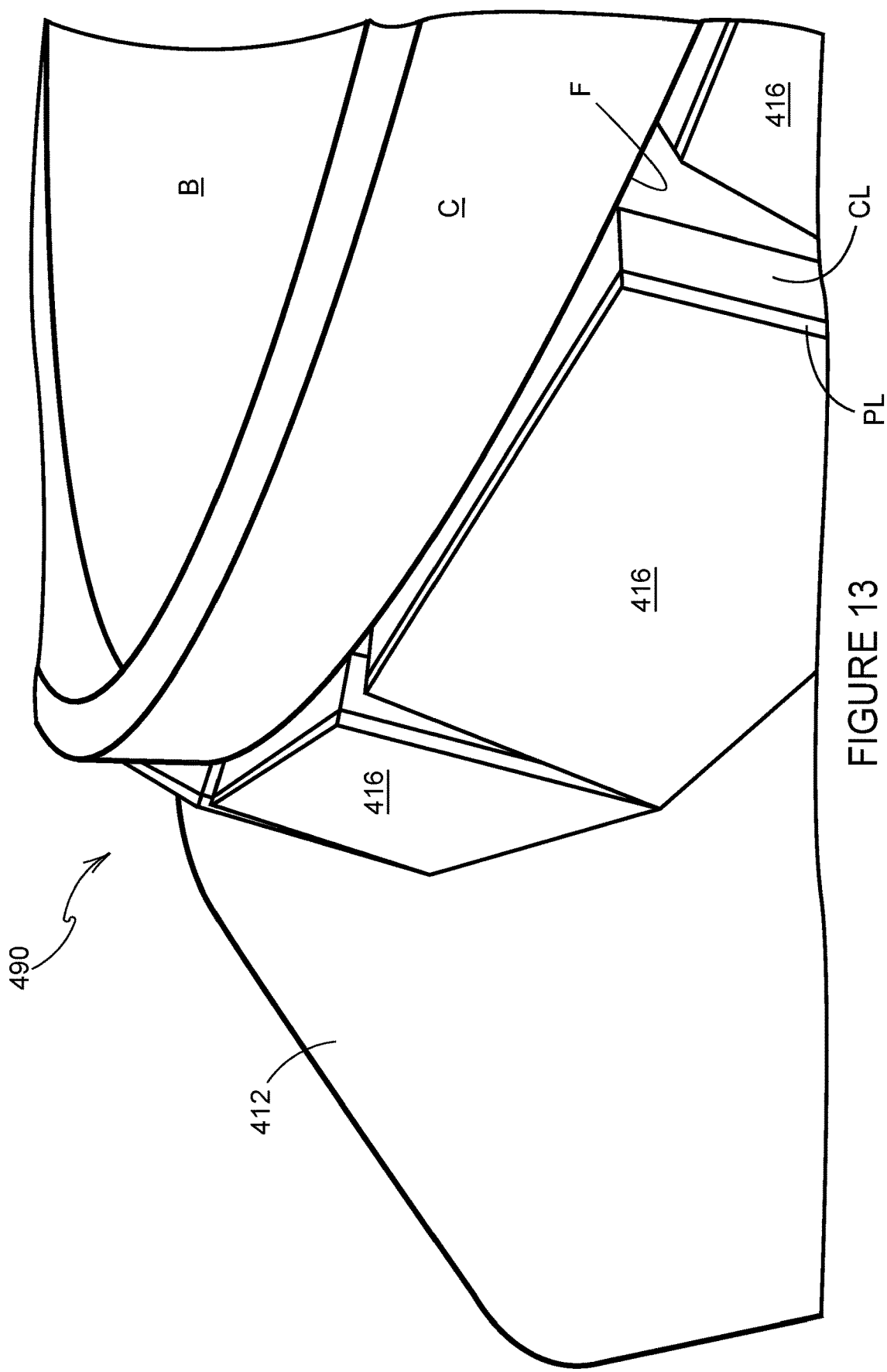
FIG. 13 is a close-up view of a portion of the carton of FIG. 12.
Figure 14:
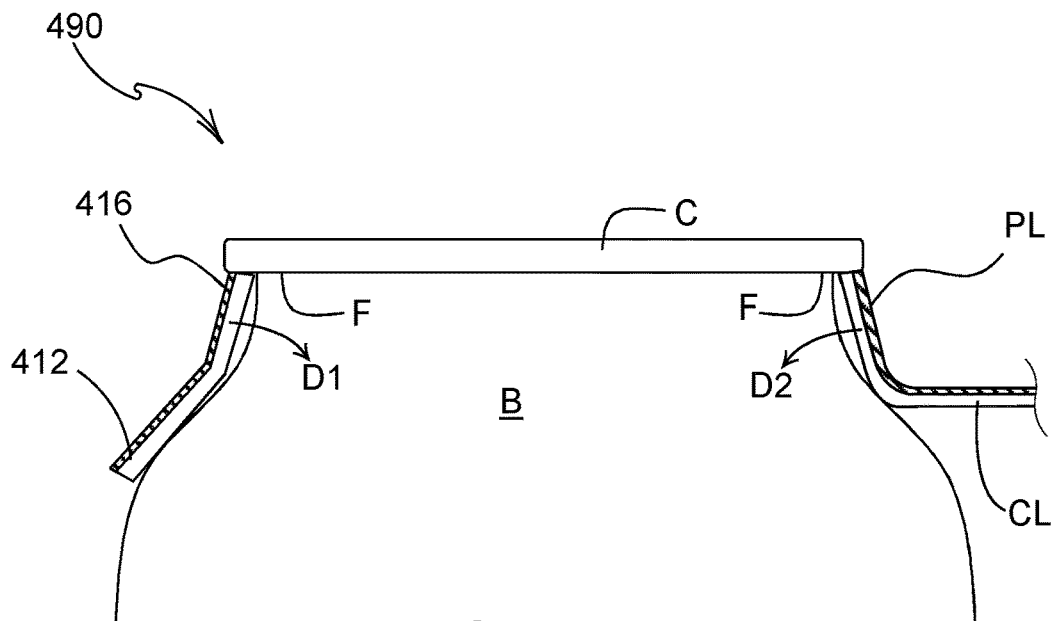
FIG. 14 is a sectional view of a portion of the carton of FIG. 13.

As illustrated in FIGS. 13 and 14 the main panel 412 includes at least a paperboard substrate CL and a tear resistant layer PL laminated together.

The main panel 412 is applied to the group of articles B with the tear resistant layer PL disposed above the paperboard substrate CL.

The main panel 412 is applied to the group of articles B with the tear resistant layer PL disposed uppermost.

When folded out of the plane of the main panel 412 the tear resistant layer PL of the article engaging tabs 416 is disposed outermost.

The paperboard substrate CL of the article engaging tabs 416 is disposed in closer proximity to the side walls of the articles B.

The paperboard substrate CL of the article engaging tabs 416 may be in contact with the side walls of the articles B.

It has been found that it is preferable to dispose the tear resistant layer PL of the article engaging tabs 416 outermost. When moisture exits or leaves the carrier 490, it exits via the bottom surface or inner surface. The tear resistant layer PL, which may be a plastics material, prevents or inhibits moisture exit via the upper or outer layer.

When the moisture exits the carrier 490 via the paperboard substrate CL surface, the inner or bottom surface the article engaging tabs 416 bend or curl inwardly towards the sidewalls of the article B being engaged as indicated by direction arrows D1, D2 in FIG. 14. This has the effect of improving or at least not reducing the security or hold of the article retention structure upon the article B.

In contrast it has been found that locating the tear resistant layer PL innermost or lowermost, or at least below the paperboard substrate CL, has the effect of curling or deforming the article engaging tabs 416 in an outward direction, away from the sidewalls of the article B. This can have the effect of disengaging the article engaging tabs 416 from the flange F, in extreme circumstances the article B may disengage from the carrier 490.

The paperboard substrate CL may be more absorbent of moisture than the tear resistant layer PL. Absorption of moisture may swell or increase the thickness of the paperboard substrate CL. The paperboard substrate CL may shrink when it dries out. The tear resistant layer PL may be more moisture resistant than the paperboard substrate CL, this difference between the two layers is thought to cause the tabs to curl.

The effect may be more prevalent in chilled beverages or food stuffs where moisture and condensation may be more pronounced or evident.

The present disclosure provides a carrier of the top engaging type having improved article retention structures. In particular, the retention structures comprise article engaging tabs some or all of which yield upon insertion of an article. The tabs engage with an article to hold or secure the article within a panel of the carrier. The carrier is constructed from a laminated substrate comprising a paperboard layer CL and a tear resistant layer PL. The tear resistant layer PL is disposed uppermost in order to reduce the likelihood of the tabs disengaging from the article. The tear resistant layer PL may comprise a printed surface, the surface of the tear resistant layer PL may be treated to improve adhesion of ink or dye.

The dimension of a tab may also be dependent upon its location in the panel of the carrier. Those tabs disposed in higher stress areas may be smaller in width than tabs subject to lesser stress.

It will be recognised that as used herein, directional references such as "top", "bottom", "base", "front", "back", "end", "side", "inner", "outer", "upper" and "lower" do not necessarily limit the respective panels to such orientation but may merely serve to distinguish these panels from one another.

As used herein, the terms "hinged connection" and "fold line" refer to all manner of lines that define hinge features of the blank, facilitate folding portions of the blank with respect to one another, or otherwise indicate optimal panel folding locations for the blank. Any reference to "hinged connection" should not be construed as necessarily referring to a single fold line only; indeed, a hinged connection can be formed from two or more fold lines wherein each of the two or more fold lines may be either straight/linear or curved/curvilinear in shape. When linear fold lines form a hinged connection, they may be disposed parallel with each other or be slightly angled with respect to each other. When curvilinear fold lines form a hinged connection, they may intersect each other to define a shaped panel within the area surrounded by the curvilinear fold lines. A typical example of such a hinged connection may comprise a pair of arched or arcuate fold lines intersecting at two points such that they define an elliptical panel therebetween. A hinged connection may be formed from one or more linear fold lines and one or more curvilinear fold lines. A typical example of such a hinged connection may comprise a combination of a linear fold line and an arched or arcuate fold line which intersect at two points such that they define a half moon-shaped panel therebetween.

As used herein, the term "fold line" may refer to one of the following: a scored line, an embossed line, a debossed line, a line of perforations, a line of short slits, a line of half-cuts, a single half-cut, an interrupted cutline, a line of aligned slits, a line of scores and any combination of the aforesaid options.

It should be understood that hinged connections and fold lines can each include elements that are formed in the substrate of the blank including perforations, a line of perforations, a line of short slits, a line of half-cuts, a single half-cut, a cutline, an interrupted cutline, slits, scores, any combination thereof, and the like. The elements can be dimensioned and arranged to provide the desired functionality. For example, a line of perforations can be dimensioned or designed with degrees of weakness to define a fold line and/or a severance line. The line of perforations can be designed to facilitate folding and resist breaking, to facilitate folding and facilitate breaking with more effort, or to facilitate breaking with little effort.

The phrase "in registry with" as used herein refers to the alignment of two or more elements in an erected carton, such as an aperture formed in a first of two overlapping panels and a second aperture formed in a second of two overlapping panels. Those elements in registry with each other may be aligned with each other in the direction of the thickness of the overlapping panels. For example, when an aperture in a first panel is "in registry with" a second aperture in a second panel that is placed in an overlapping arrangement with the first panel, an edge of the aperture may extend along at least a portion of an edge of the second aperture and may be aligned, in the direction of the thickness of the first and second panels, with the second aperture.

The invention claimed is:

1. A top-engaging carrier for packaging at least one article, the top-engaging carrier comprising: a main panel comprising an article retention structure for suspending the at least one article therefrom, the article retention structure comprising at least one aperture struck from the main panel for receiving an upper portion of a respective article of the at least one article, the main panel further comprising an annular series of tabs formed around the at least one aperture such that the at least one aperture is defined at least in part by distal edges of the tabs, the tabs of the annular series being hingedly connected to the main panel such that at least some of the tabs yield out of the plane of the main panel when the upper portion of the article is received in the at least one aperture so as to bear against the article, the main panel comprising an upper surface and an opposed lower surface, the upper surface comprising a surface facing upwards when the carrier is applied to the upper portion of the at least one article, the main panel further comprising a paperboard substrate and a tear resistant layer wherein the tear resistant layer is disposed closer to the upper surface than the paperboard substrate and wherein the upper surface is printable such that a printed ink layer is applicable directly on either the tear resistant layer or an intervening printable layer disposed immediately above the tear resistant layer.

2. A top engaging carrier according to claim 1 wherein the tear resistant layer provides the upper surface.

3. A top engaging carrier according to claim 1 wherein the main panel further comprises an adhesive layer disposed between the tear resistant layer and paperboard substrate.

4. A top engaging carrier according to claim 1 wherein the main panel comprises the printed ink layer for providing the upper surface, the printed ink layer being disposed above the tear resistant layer such that the tear resistant layer is interposed between the printed ink layer and the paperboard substrate.

5. A top engaging carrier according to claim 4 wherein the main panel comprises the printable layer interposed between the printed ink layer and the tear resistant layer.

6. A top engaging carrier according to claim 4 wherein the paperboard substrate includes a coating layer which is disposed to provide the lower surface of the main panel.

7. A top engaging carrier according to claim 4 wherein the paperboard substrate includes a coating layer which is disposed between the other part of the paperboard substrate and the tear resistant layer.

8. A top engaging carrier according to claim 1 wherein the tear resistant layer comprises an n-axially oriented film.

9. A top engaging carrier according to claim 8 wherein the tear resistant layer comprises a layer of Polyethylene Terephthalate (PET).

10. A top-engaging carrier according to claim 1 wherein the tabs deform towards the article as a result of moisture exiting via the paperboard substrate.

11. A package comprising a top-engaging carrier and at least one article engaged by the top engaging carrier, the top-engaging carrier comprising a main panel comprising an article retention structure from which the at least one article is suspended, the article retention structure comprising at least one aperture struck from the main panel in which an upper portion of a respective article of the at least one article is received, the main panel further comprising an annular series of tabs formed around the at least one aperture such that the at least one aperture is defined at least in part by distal edges of the tabs, the tabs of the annular series being hingedly connected to the main panel and engaging with the upper portion of the at least one article such that at least some of the tabs yield out of the plane of the main panel so as to bear against the upper portion of the at least one article, the main panel comprising an upper surface facing upwards and a lower opposing surface facing downwards, the main panel further comprising a paperboard substrate and a tear resistant layer wherein the tear resistant layer is disposed closer to the upper surface than the paperboard substrate such that the tabs deform towards the article when moisture exits via the paperboard substrate.

12. A package according to claim 11 wherein a portion of the paperboard substrate in each tab is disposed between the upper portion of the at least one article and a portion of the tear resistant layer in a respective one of the tabs.

13. A package according to claim 12 wherein the portion of the paperboard substrate in each tab is disposed adjacent to the upper portion of the at least one article or wherein the portion of the paperboard substrate in each tab is in contact with the upper portion of the at least one article.

14. A package according to claim 11 wherein the main panel further comprises a printed ink layer for providing the upper surface, the printed ink layer being disposed above the tear resistant layer such that the tear resistant layer is interposed between the printed ink layer and the paperboard substrate.

15. A package according to claim 11 wherein the paperboard substrate includes a coating layer which is disposed between the other part of the paperboard substrate and the tear resistant layer.

16. A package according to claim 11 wherein the paperboard substrate includes a coating layer which is disposed such that the other part of the paperboard substrate is interposed between the coating layer and the tear resistant layer.

17. A method of forming a package of at least one article and a top-engaging carrier, the method comprising:
    providing a blank comprising a main panel comprising an article retention structure for suspending the at least one article therefrom, the article retention structure comprising at least one aperture struck from the main panel for receiving an upper portion of the at least one article, the main panel further comprising an annular series of tabs formed around the at least one aperture, the tabs of the annular series being hingedly connected to the main panel, the main panel comprising an upper surface and an opposing lower surface, the main panel further comprising a paperboard substrate and a tear resistant layer which is disposed closer to the upper surface than the paperboard substrate, wherein the upper surface is printable such that a printed ink layer is applicable directly on either the tear resistant layer or an intervening printable layer disposed immediately above the tear resistant layer;

providing the at least one article;

orienting the blank such that the lower surface faces towards the at least one article;

engaging the blank with the at least one article such that the upper portion of the at least one article passes through the paperboard substrate and subsequently through the tear resistant layer so as to secure the at least one article in the at least one aperture by engaging the tabs with an undercut of the at least one article, wherein the tabs deform towards the at least one article when moisture exits via the paperboard substrate.

18. A method according to claim 17 wherein the orienting step comprises orienting the tear resistant layer so as to face away from the at least one article.

19. A method according to claim 17 wherein the engaging step comprises folding the tabs of the annular series out of the plane of the main panel while maintaining the upper surface facing upwards.

20. A package according to claim 11 wherein the upper surface is printable such that a printed ink layer is applicable directly on either the tear resistant layer or an intervening printable layer disposed immediately above the tear resistant layer.

* * * * *